United States Patent
Hoffman et al.

(10) Patent No.: US 7,981,194 B2
(45) Date of Patent: Jul. 19, 2011

(54) AIR DRYING ARRANGEMENT

(75) Inventors: Fred W. Hoffman, Columbia Station, OH (US); Leonard A. Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 557 days.

(21) Appl. No.: 11/595,710

(22) Filed: Nov. 10, 2006

(65) Prior Publication Data

US 2008/0110340 A1    May 15, 2008

(51) Int. Cl.
*B01D 53/02* (2006.01)
(52) U.S. Cl. ........... 95/118; 96/110; 96/115; 96/133; 96/134; 96/138; 55/418; 55/419; 55/DIG. 17
(58) Field of Classification Search ......... 95/118; 96/108–154; 55/DIG. 17, 418–419, 385.3, 55/392, 428, 432, 434, 485–486; 34/80; 210/DIG. 17
See application file for complete search history.

(56) References Cited

U.S. PATENT DOCUMENTS

| | | | |
|---|---|---|---|
| 5,209,764 A | | 5/1993 | Eberling |
| 5,378,266 A | | 1/1995 | Elamin |
| 5,660,607 A | * | 8/1997 | Jokschas et al. ........ 55/350.1 |
| 5,662,727 A | | 9/1997 | Castle et al. |
| 5,961,698 A | * | 10/1999 | Dossaji et al. .......... 96/130 |
| 6,125,553 A | | 10/2000 | Quinn et al. |
| 6,126,724 A | * | 10/2000 | Martin et al. .......... 96/4 |
| 6,581,297 B1 | | 6/2003 | Ginder |
| 6,695,893 B2 | * | 2/2004 | Hoffman et al. .......... 95/21 |
| 6,743,277 B2 | | 6/2004 | Goodell et al. |
| 7,097,696 B2 | | 8/2006 | Salzman et al. |
| 2005/0188848 A1 | * | 9/2005 | Salzman et al. .......... 96/134 |

FOREIGN PATENT DOCUMENTS

| | | |
|---|---|---|
| EP | 0933118 A1 | 8/1999 |
| WO | 02074422 A1 | 9/2002 |

OTHER PUBLICATIONS

Bendix Commercial Vehicle Systems LLC, EverFlow Air Dryer Control Module, 2 pgs. http://www.bendix.com/bendix/products/SellSheet.do?p=/EverFlow_Control_Module available on-line, printed Feb. 5, 2006.
Bendix Commercial Vehicle Systems LLC, air dryers from Bendix, AD-IS, Integrated Solution Air Dryer, 2 pgs., copyright Feb. 2002.
European Search Report for EP Application No. 07120286.5, dated Feb. 23, 2011.
European Search Opinion for EP Application No. 07120286.5, dated Feb. 23, 2011.

* cited by examiner

*Primary Examiner* — Jason M Greene
*Assistant Examiner* — Karla Hawkins
(74) *Attorney, Agent, or Firm* — Calfee, Halter & Griswold LLP

(57) ABSTRACT

An air drying arrangement for a commercial vehicle is provided having two or more desiccant canisters arranged in parallel on a single air dryer body. The arrangement may include an coupling device that attaches to the body and allows the two or more desiccant containing canisters to mount to the device. The arrangement may be configured to balance the flow of air to each of the desiccant containing canisters when drying air and/or when regenerating the desiccant.

19 Claims, 4 Drawing Sheets

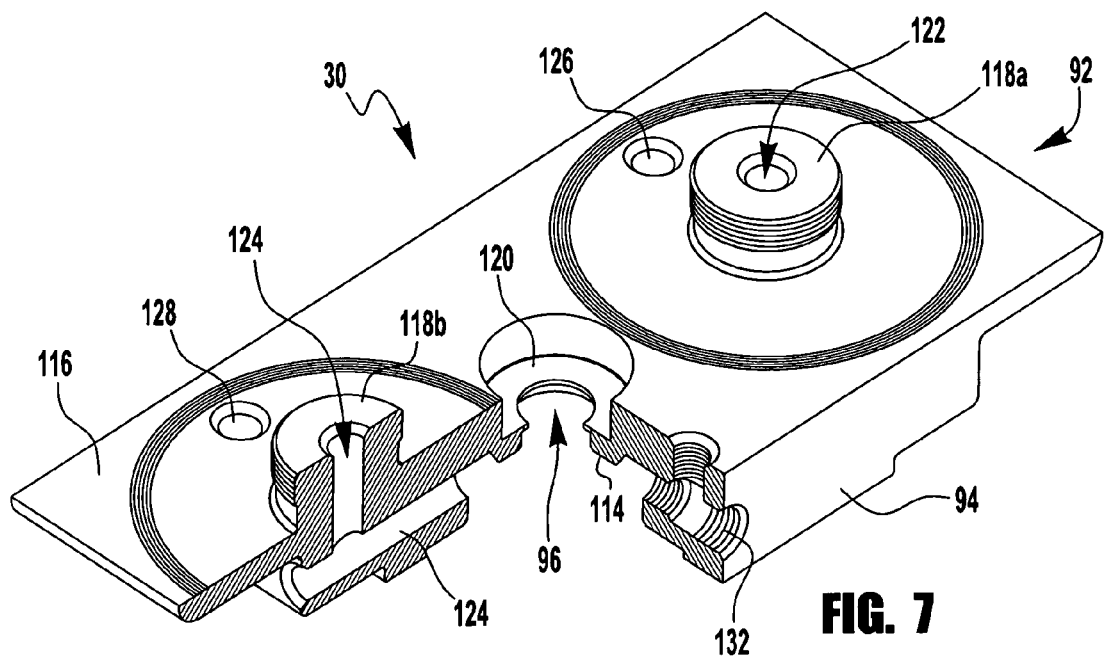
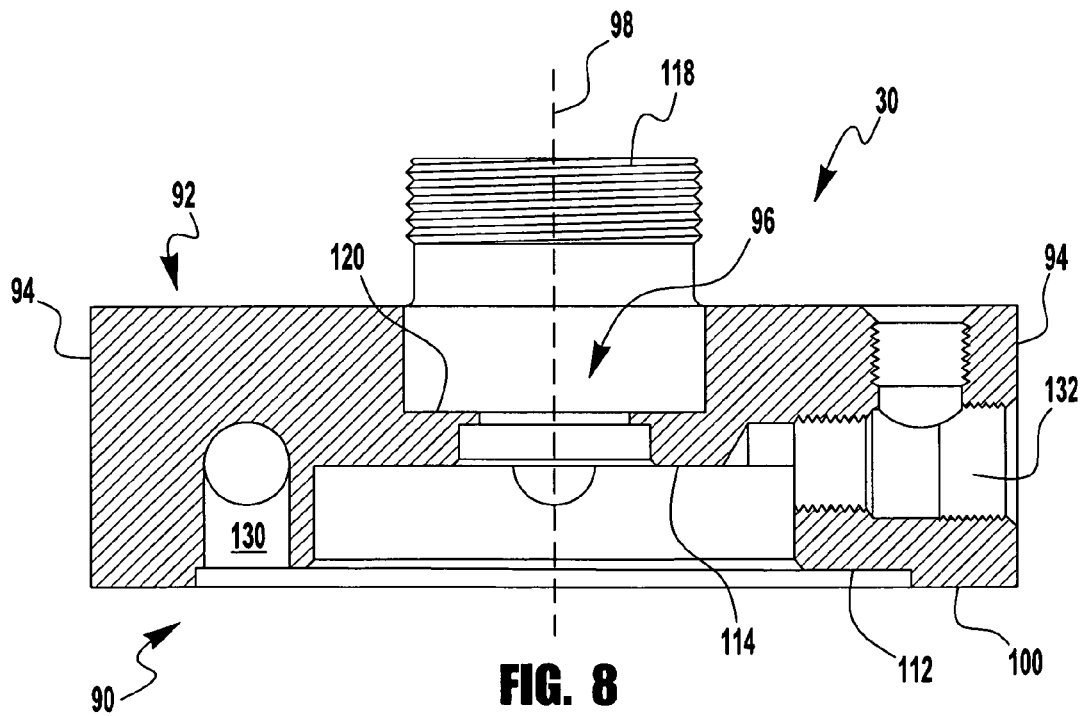

AIR DRYING ARRANGEMENT

BACKGROUND OF THE INVENTION

Commercial vehicles may utilize an on-board compressed air system to supply compressed air for operating air brakes, lift axles, air suspension, air powered accessories and perform other functions. The compressed air often contains moisture that must be removed to avoid the build-up of water in the air lines. Water in the air lines may cause problems, such as freeze-up in cold conditions, that may lead to system failure. Known air drying systems dry the compressed air by flowing it through a desiccant material to absorb the moisture. The desiccant material may be housed in a spin-on cartridge or canister that attaches to an air dryer body or manifold. Typical air dryers utilize one desiccant cartridge to dry the air. When the vehicle is not demanding compressed air, the system will regenerate the desiccant by reverse flowing a small percentage of the dried air back through the desiccant to absorb and discard some of the moisture collected.

In some vehicle applications, however, such as vehicles with multiple lift axles, the demand for compressed air, and thus air drying, may exceed the capacity of a known single desiccant cartridge system. When the drying capacity of the system is exceeded, the air dryer system becomes overwhelmed, which may result in moisture passing into the air brake system and the desiccant breaking down

SUMMARY

In an illustrated embodiment of an arrangement applying at least some of the principles of the invention, an air drying arrangement for a commercial vehicle is disclosed. The arrangement may include multiple desiccant containing canisters that are fluidly coupled, in parallel, to a single air dryer body. Thus, the air drying arrangement may have improved air drying ability as compared to known single desiccant cartridge air dryers. In one embodiment, a pair of desiccant containing canisters are fluidly coupled to an air dryer body by a coupling device, such as for example, one or more components such that both canisters are drying compressed air in parallel.

This application also discloses adapting an air dryer configured with a single desiccant containing canister and which has a first air drying capacity, to an air drying arrangement configured with multiple desiccant containing canisters and which has a second air drying capacity that is greater than the first air drying capacity. In one embodiment, at least two desiccant containing canisters are fluidly coupled to an air dryer body by a coupling device. In one embodiment, the coupling device include an adapter that mounts to the air dryer body and a manifold that mounts to the adapter. The at least two desiccant containing canisters may mount to the manifold such that compressed air may flow through the canisters in parallel.

This application also discloses balancing the purge flow between multiple desiccant containing canisters arranged in parallel. In one embodiment, the air drying arrangement includes a chamber configured such that air exiting the chamber flows in substantially equal amounts to each of a plurality of desiccant containing canisters. In another embodiment, two or more coupling components, that cooperatively define the chamber, mount between the air dryer body and the multiple desiccant containing canisters.

Further advantages and benefits will become apparent to those skilled in the art after considering the following description and appended claims in conjunction with the accompanying drawings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of the invention.

FIG. 7 is sectioned perspective view of the second component of FIG. 6; and FIG. 8 is a cross-sectional view of the second component of FIG. 6.

DETAILED DESCRIPTION

Figure 1:
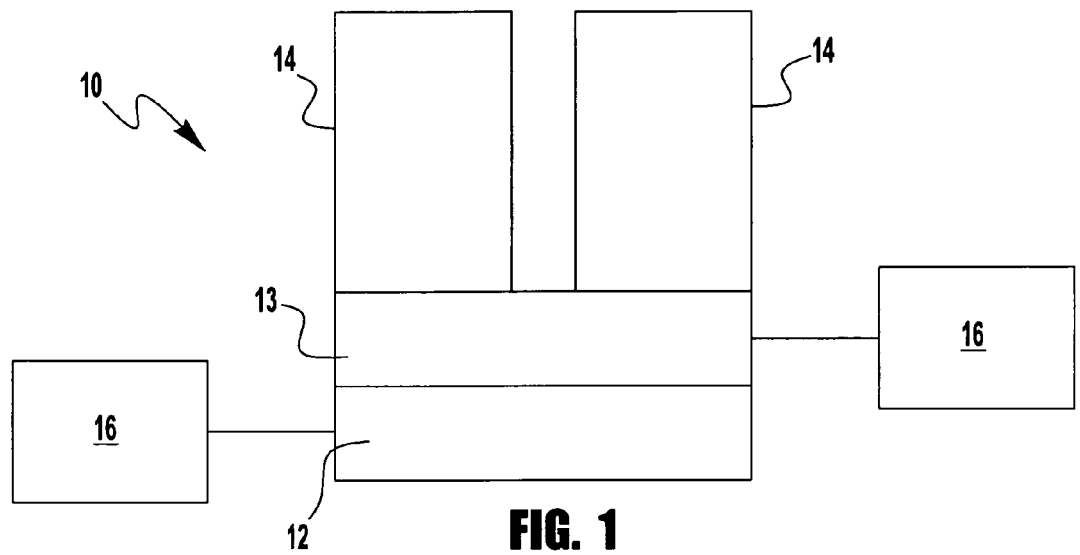
FIG. 1 is a schematic illustration of an exemplary embodiment of an air drying arrangement applying principles of the invention.

The present application is directed broadly to an air drying arrangement for a commercial vehicle. The arrangement may provide increased air drying capacity as compared to known single desiccant cartridge air dryers. In one embodiment, the air drying arrangement may include two or more desiccant cartridges fluidly coupled in parallel to a single air dryer body. The arrangement may include a coupling device that allows the two or more desiccant cartridges to fluidly communicate with the air dryer body. The coupling device, therefore, may be used to convert a single desiccant cartridge air dryer to an air drying arrangement having multiple desiccant canisters arranged in parallel. The adapted arrangement may also be configured to balance the flow of purge air through the desiccant canisters when regenerating the desiccant to improve the air drying capability of the arrangement.

This air drying arrangement may have certain advantages as compared to other known approaches to increasing the air drying capacity of a vehicle compressed air system. For example, simply adding a second air dryer assembly to the vehicle may not be desirable due to space constraints in mounting the second air dryer. Furthermore, using a continuous drying system, which typically uses two desiccant cartridges where one cartridge is regenerating while the other cartridge is drying air, requires additional components and added complexity, such as requiring a control system to switch the cartridges between drying and regenerating.

While the exemplary embodiments described herein are presented in the context of an air drying arrangement having a pair of desiccant containing canisters attached, in parallel, to an air dryer body by a coupling device including an adapter component and a manifold component, those skilled in the art will readily appreciate that the present invention may be configured in other ways. For example, the air drying arrangement may include more than two desiccant cartridges. Further, the coupling device may be a single component or two or more components utilized to fluidly couple the desiccant containing canisters and air dryer body.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The terms upper, lower, top, bottom, upward, and downward, when used in this application, are merely references used for convenience of explanation and form no structural or use limitation or reference for the invention.

FIG. 1 schematically illustrates an example an air drying arrangement 10 that may include an air dryer body 12, having a pair of desiccant containing canisters or cartridges 14 fluidly coupled to it by a coupling device 13. The coupling device 13 may include one or more coupling components, such as for example, a manifold and an adapter. The coupling device 13 may be designed to allow fluid communication between the desiccant cartridges 14 and the body 12. In known, single desiccant cartridge air dryers, a desiccant cartridge is threadably attached to an air dryer body. In the illustrated embodiment, the coupling device 13 may attach between the air dryer body 12 and the desiccant cartridges 14. The air dryer body 12 may be a known, single desiccant cartridge air dryer body or may be a modified or newly developed body.

One or more purge volumes 16 may be in fluid communication the desiccant cartridges 14. The purge volumes may include one purge volume or multiple purge volumes. The purge volumes may be arranged in series or parallel and may fluidly communicate with the air dryer body 12 and/or the coupling device 13 through one or more flow passages. In FIG. 1, a first purge volume is illustrated as connecting to the air dryer body 12 and a second purge volume is illustrated as connecting to the coupling device 13. Other configurations, however, are possible. For example, both purge volumes may be connected to the body 12 or both purge volumes may connect to the coupling device 13.

The arrangement 10 may operate in a drying phase and a regenerating phase. In the drying phase, supply air may flow from the body 12 into each desiccant containing canister 14 in parallel to remove moisture from the air. The drier air may flow from the canisters 14 back into the body which may distribute the dried air as needed, such as for example to operate a system. A portion of the dried air may also sent to a reservoir to be stored as purge air during the drying phase.

In the regenerating phase, the purge air may flow into the body 12 and/or coupling device 13 and into each of the desiccant containing canisters 14, in parallel and in a reverse direction, to remove some of the moisture the desiccant removed during the drying phase. The purge air and moisture may then be discarded, typically vented to atmosphere.

Figure 2:
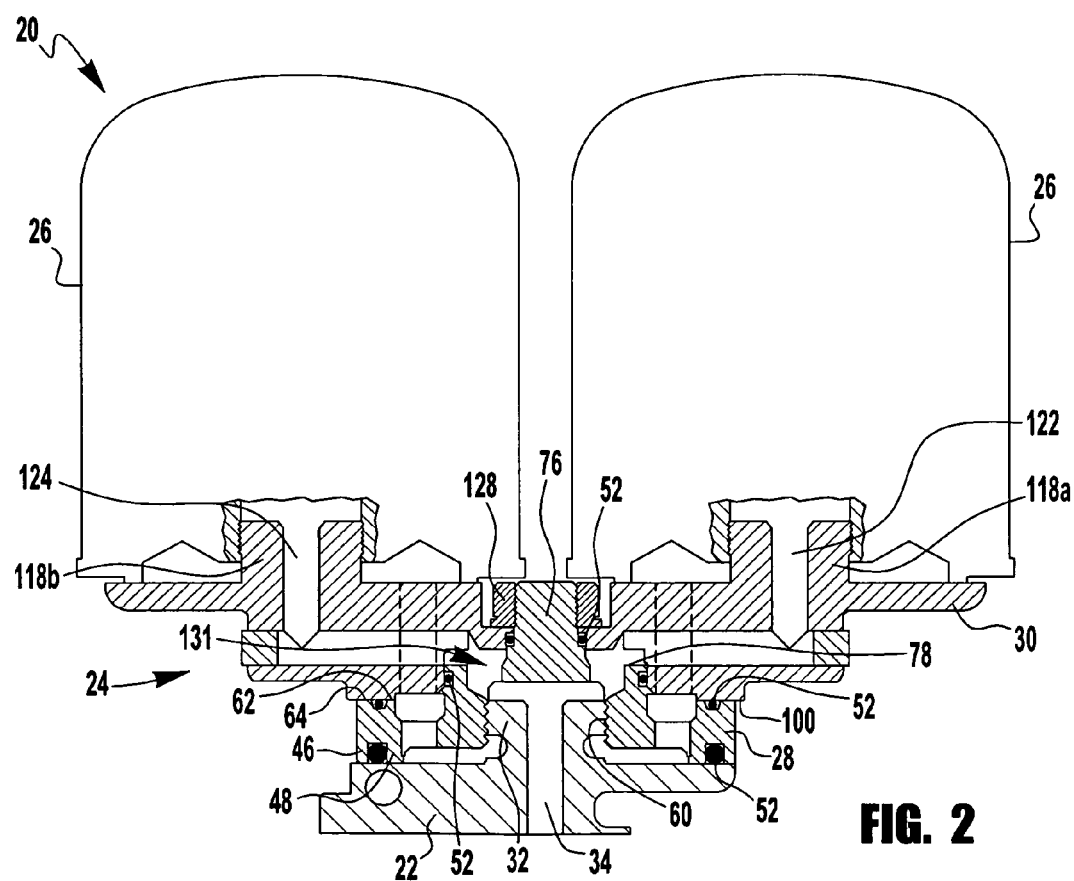
FIG. 2 is a cross-sectional view of an exemplary embodiment of the air drying arrangement of FIG. 1.

FIG. 2 illustrates an exemplary embodiment of the air drying arrangement 20. The arrangement 20 may include an air dryer body 22, a coupling device 24, and two desiccant containing canisters 26. The coupling device 24 may include a first coupling component 28 and a second coupling component 30 for connecting and placing the air dryer body 22 and the desiccant containing canisters 26 in fluid communication with each other.

Desiccant containing canisters for use in air drying arrangements are known in the art; therefore, the construction and operation of the canisters are not discussed in detail in this disclosure. Generally, known canisters may mount to an air dryer body so that compressed air may flow through the desiccant in the canisters to remove moisture from the air. Dry air may also be reverse flowed through the desiccant to remove some of the moisture captured. The present invention may utilize known or newly developed desiccant containing canisters.

Figure 3:
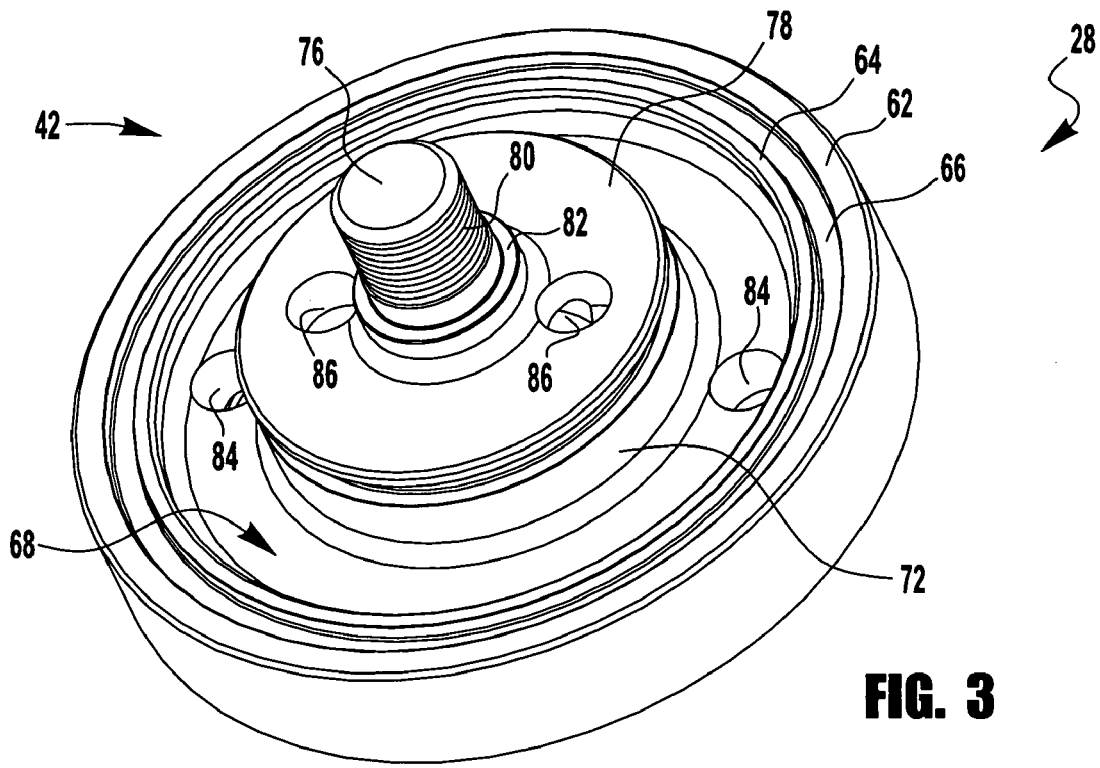
FIG. 3 is a perspective view of an exemplary embodiment of a first component of the air drying arrangement of FIG. 1.
Figure 4:
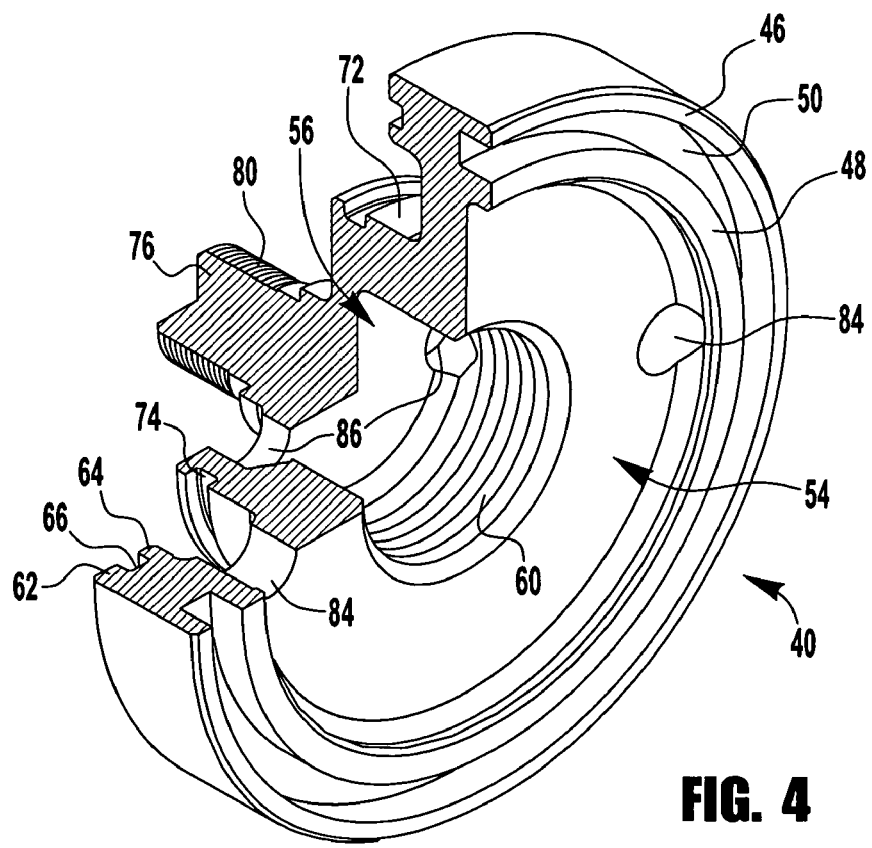
FIG. 4 is sectioned perspective view of the first component of FIG. 3
Figure 5:
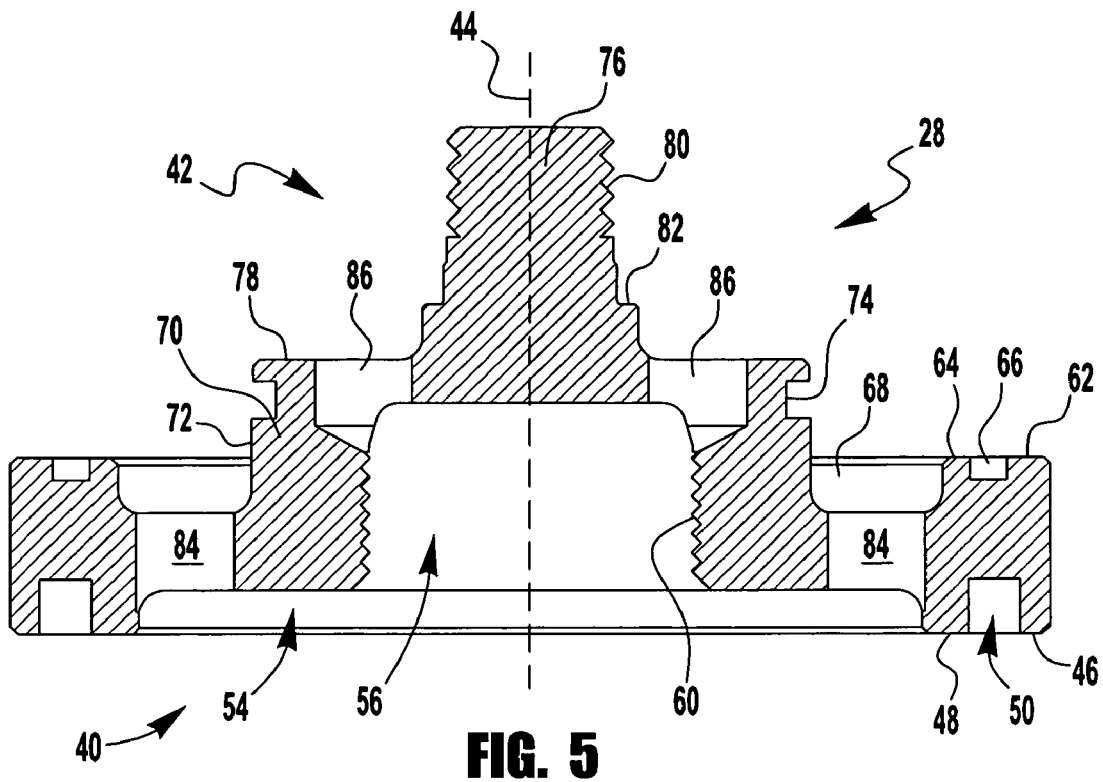
FIG. 5 is cross-sectional view of the first component of FIG. 3.

FIGS. 3-5 illustrate an example of the first coupling component 28. In the depicted embodiment, the first coupling component 28 is realized as an adapter for attaching the air dryer body 22. The adapter 28 may be generally cylindrical having a bottom portion 40 and a top portion 42 centered on an axis 44 (see FIG. 5). The bottom portion 40 may include an outer lip 46 and an inner lip 48 connected by a groove 50 for receiving a sealing element 52 (see FIG. 2), such as for example, an o-ring. The bottom portion 40 may also include a first recessed area 54 and a second recessed area 56. The first recessed area 54 being radially outward of the second recessed area 56. The second recessed area 56 may include female threads 60 along an inner surface for threadably engaging the threaded extension 32 of the air dryer body 22 (FIG. 2).

The top portion 42 of the adapter 28 may include an outer lip 62 and an inner lip 64 separated by a groove 66 for receiving a sealing member 52, such as for example an o-ring. The top portion 42 may also include a third recessed portion 68 radially separating the inner lip 64 from an axially extending center portion 70. The axially extending center portion 70 may include a generally cylindrical axially extending side surface 72.

The side surface 72 may include a radially extending groove 74 for receiving a seal member 52 (FIG. 2). The top portion 42 may also include an axially extending stem 76 connected to the side surface 72 by a radially extending surface 78. The stem 76 may include male threads 80 and a radial shoulder 82.

The adapter 28 may also include one or more flow passages for communicating air through the arrangement 20. In the illustrated embodiment, the adapter 28 may include a first and second pair 84, 86 of flow passages. The first pair of flow passages 84 may extend from the first recessed area 54 through the adapter 28 to the third recessed area 68. The first pair of flow passages 84 may, though not necessarily, be circumferentially spaced about 180 degrees apart, each passage a substantially equal distance radially from the axis 44. The second pair of flow passages 86 may extend from the second recessed area 56 through the adapter 28 to the radially extending surface 78 of the axially extending center portion 70. The second pair of flow passages 86 may, but not necessarily, be circumferentially spaced 180 degrees apart, each passage a substantially equal distance radially from the axis 44.

Figure 6:
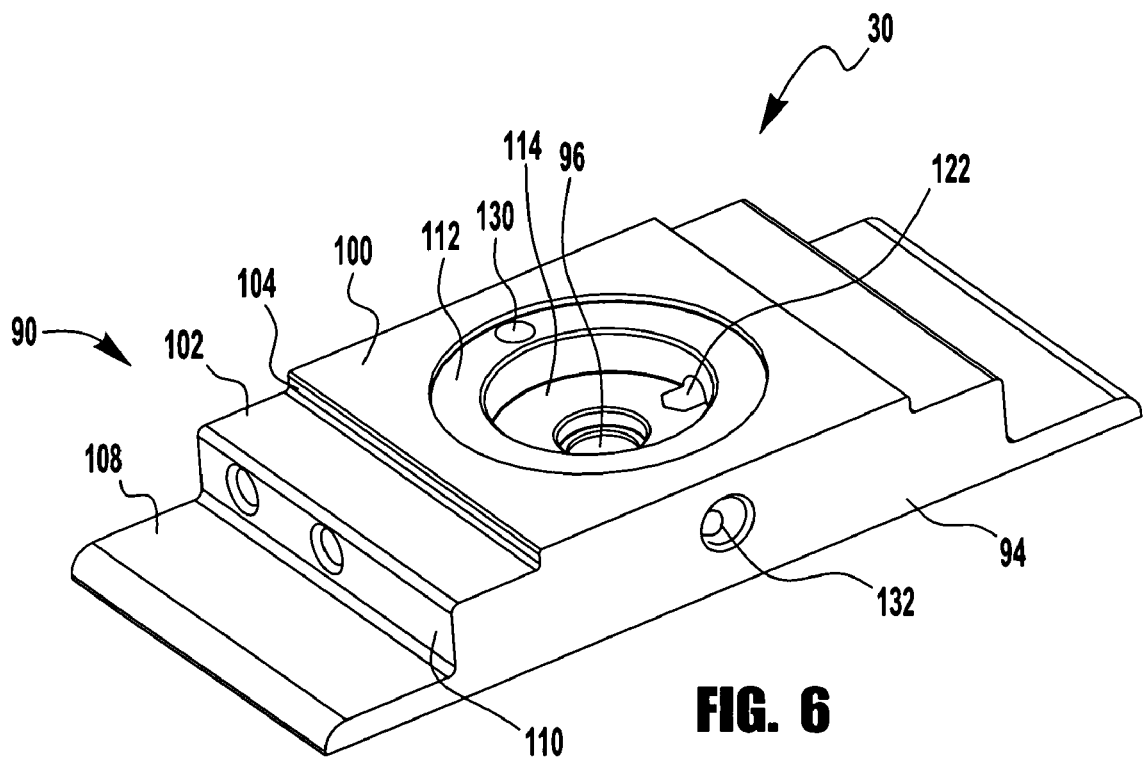
FIG. 6 is a perspective view of an exemplary embodiment of a second component of the air drying arrangement of FIG. 1.

FIGS. 6-8 illustrate an example of the second coupling component 30. In the depicted embodiment, the second coupling component 30 is realized as a manifold for attaching to the adapter 28 and for mounting the plurality of desiccant containing canisters 26. The manifold 30 may include a bottom portion 90, a top portion 92, and two generally parallel side surfaces 94. The manifold 30 may include a bore 96 extending from the bottom portion 90 to the top portion 92 and centered on an axis 98. The bottom portion 90 may include a first radially extending, generally planar surface 100 connected to a second radially extending, generally planar surface 102 by a first axially extending surface 104. The second radially extending, generally planar surface 102 may be connected to a third radially extending, generally planar surface 108 by a second axially extending surface 110. The bottom portion 90 may also include a first and second counter bore 112, 114 circumscribing the bore 96.

The top portion 92 of the manifold 30 may include a generally planar surface 116 and two or more extensions 118, each configured to receive one of the desiccant-containing canisters 26. In the illustrated embodiment, a pair of threaded extensions 118a, 118b is provided. The top portion 92 may also include a counterbore 120 that circumscribes the bore 96.

The manifold 30 may also include one or more flow passages for communicating air through the arrangement 20. In the illustrated embodiment, a first flow passage 122 and a second flow passage 124 extend from the first and second threaded extensions 118a, 118b, respectively, through the manifold 30 to the second counter bore 114. In addition, a third flow passage 126 and a fourth flow passage 128 may extend from the generally planar surface 116, adjacent each extension 118a, 118b, respectively, through the manifold 30 to the first counter bore 112. In the illustrated embodiment, the third and fourth flow passages 126, 128 meet to form a fifth flow passage 130 that extends to the first counter bore 112. A purge air flow path 132 also extends through the manifold 30 from a side surface 94 to the second counterbore 114.

Referring to FIG. 2, the female threads 60 on the adapter 28 may threadably mount to the extension 32 on the air dryer body 22. The adaptor 28 may be threaded onto the manifold extension 32 such that the outer lip 46 and the inner lip 48 engage a surface on the air dryer body 22 and the sealing element 52 in the groove 50 creates a fluid seal between the adapter 28 and the body 22.

The manifold 30 may assemble onto the adapter 28, such that the stem 76 is received through the bore 96. The first radially extending surface 100 on the bottom portion 90 of the manifold 30 may engage the outer and inner lips 62, 64 of the top portion 42 of the adapter 28 such that the manifold 30 rests on the adapter top portion 42. A fastener 128, such as a nut for example, may threadably engage the stem 76 to secure the adapter 28 and the manifold 30 together. Sealing elements 52 in the axially extending groove 66, in the radially extending groove 74, and on the shoulder 82 create fluid seals between the adapter 28 and the manifold 30. The desiccant containing canisters 26 may mount to the manifold 30, one each on each of the extensions 118a, 118b.

When the adapter 28 and the manifold 30 are assembled together, the second counter bore 114 of the manifold 30 and the radially extending surface 78 of the adapter 28 define an inner chamber 131 (see FIG. 2).

When drying air, compressed air from a source of compressed air, such as for example a reservoir or compressor, may flow from the body 22, through the adapter 28 via flow passages 84, through the manifold 30 via flow passages 130, 128, and 126, and into each of the desiccant containing canisters 26 in parallel. The fifth flow passage 130 may split into the third and fourth flow passages 126, 128 at a location that is substantially an equal distance from each of the desiccant canisters 26. Therefore, a substantially equal amount of compressed air flows to each of the canisters.

As the compressed air flows through each of the canisters 26, the desiccant removes moisture from the air. The drier air exits the canisters 26 via the first and second flow passages 122, 124, flows through the adapter 28 and manifold 30, and to the air dryer body 22 via the inner chamber 131 and flow passages 86. The purge air reservoirs 16 (see FIG. 1) may supply the purge air to the canisters 26 to regenerate the canisters 26 and may receive dried air from the canisters to replenish the purge reservoirs. In the illustrated example, a first purge air reservoir may be in fluid communication with the air dryer body 22 such that air to flow between the body and the first purge reservoir. In addition, a second purge air reservoir 16 may be in fluid communication with the manifold 30 such that air may flow between the second purge air reservoir 16 and the manifold via the purge flow passage 132.

In regenerating the desiccant in the canisters 26, purge air (previously dried) flows through the arrangement 20 in the reverse direction from the drying phase. The purge air reservoirs 16 (see FIG. 1) may connect to the arrangement 20 to supply the purge air. In the illustrated example, a first purge air reservoir may be in fluid communication with the air dryer body 22 such that purge air may flow through the body and enter the coupling device 24 via the flow passage 34. In addition, a second purge air reservoir may also be in fluid communication with the manifold 30 such that purge air may flow into the coupling device 24 via the purge flow passage 132. Both the purge air entering the coupling device 24 via the flow passage 34 and via the flow passage 132, flow into the inner chamber 131. In this sense, the inner chamber 131 acts as a mixing chamber for the purge air from the two purge air reservoir.

The purge air in the inner chamber 131 splits and flows into each of the two desiccant canisters 26 is substantially equal amounts via flow passages 122, 124. Thus, the inner chamber 131 is configured as a means for balancing the flow of purge air from the plurality of purge air sources to each of the desiccant containing canisters 26. In the illustrated example, the inner chamber 131 is substantially an equal distance from each of the desiccant containing canisters 26.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. An air drying arrangement, comprising:
   a single air dryer body;
   a plurality of desiccant containing canisters in fluid communication with the air dryer body for drying compressed air received from the body; and
   a unitary coupling device positioned between and removably attached to the air dryer body and the plurality of desiccant containing canisters; the unitary coupling device including:
      a first and second fluid passage, each of the first and second fluid passages being in fluid communication with a respective one of the plurality of desiccant containing canisters, wherein compressed supply air flows in substantially the same direction at substantially the same time through each of the first and second fluid passages in substantially equal amounts; and
      an inner chamber in fluid communication with a purge air fluid passage, wherein the inner chamber is further in fluid communication with a third and fourth fluid passage for receiving the purge air in substantially the same direction at substantially the same time for regenerating the desiccant in the canisters.

2. The air drying arrangement of claim 1 wherein the inner chamber is located at a substantially equal distance from each of the plurality of desiccant containing canisters.

3. The air drying arrangement of claim 1 wherein the purge air flows from the inner chamber, through the third and fourth fluid passages, to each of the plurality of desiccant containing canisters in substantially equal amounts.

4. The air drying arrangement of claim 3 wherein the purge air enters the inner chamber from a plurality of purge air fluid passages.

5. The air drying arrangement of claim 1 wherein the plurality of desiccant containing canisters is two canisters.

6. The air drying arrangement of claim 1 wherein the unitary coupling device comprises an adapter and a manifold, each of the plurality of desiccant containing canisters being threadably attached to the manifold and the adapter being threadably attached to the air dryer body.

7. The air drying arrangement of claim 1 wherein the single air dryer body includes a male threaded extension defining a flow passage; and wherein the unitary coupling device includes a female threaded recess that threadably engages the male threaded extension.

8. The air drying arrangement of claim 1 wherein the unitary coupling device further comprises an adapter coupled to a manifold.

9. The air dryer assembly of claim 8 wherein the inner chamber is cooperatively defined by the adapter and the manifold.

10. The air drying arrangement of claim 8 wherein the adapter threadably engages the air dryer body and the plurality of desiccant containing canisters threadably mount to the manifold.

11. An air drying assembly for use on a commercial vehicle, comprising
a single air dryer body;
at least two desiccant cartridges;
a unitary coupling device disposed between and removably attached to the single air dryer body and the at least two desiccant cartridges; the coupling device including a mixing chamber and a plurality of flow passages that place the air dryer body in fluid communication with the at least two desiccant cartridges; and
a pair of purge air reservoirs in fluid communication with the mixing chamber; wherein purge air flows from the mixing chamber in substantially equal amounts to each of the at least two desiccant cartridges, the at least two desiccant cartridges being regenerated substantially simultaneously.

12. The air dryer assembly of claim 11 wherein the coupling device is threadably connected to the manifold portion.

13. The air dryer assembly of claim 11 wherein the coupling device includes an adapter attached to a manifold.

14. The air dryer assembly of claim 13 wherein the mixing chamber is cooperatively defined by the adapter and manifold.

15. The air dryer assembly of claim 13 wherein the adapter includes a threaded portion for attaching to the air dryer body, and wherein the manifold includes a plurality of threaded extensions; each threaded extension being configured to threadably engage each of the at least two desiccant cartridges.

16. An air drying arrangement, comprising:
a single air dryer body;
a unitary coupling device removably attached to and in fluid communication with the body;
a plurality of desiccant cartridges removably attached to and in fluid communication with the coupling device; and
a means for balancing the flow of purge air to the plurality of desiccant cartridges wherein the means for balancing the flow of purge air comprises a chamber and at least two flow passages positioned within the unitary coupling device, wherein the purge air flows at substantially the same time and in substantially the same direction through the at least two flow passages to the plurality of desiccant cartridges.

17. The air drying arrangement of claim 16 wherein coupling device comprises an adapter attached to a manifold, and wherein the chamber is cooperatively defined by the adapter and the manifold.

18. An air drying arrangement, comprising:
a single air dryer body;
a first desiccant canister;
a second desiccant canister;
a unitary coupling device removably attached to the single air dryer body at a first surface of the unitary coupling device and removably attached to the first desiccant canister and the second desiccant canister at a second surface of the unitary coupling device, the unitary coupling device including:
a first fluid passage and a second fluid passage, wherein supply air flows through the first fluid passage to the first desiccant canister and through the second fluid passage to the second desiccant canister substantially simultaneously in a first direction during a drying phase; and
a third fluid passage and a fourth fluid passage, wherein purge air flows through the third fluid passage to the first desiccant canister and through the fourth fluid passage to the second desiccant canister substantially simultaneously in a second direction during a regeneration phase.

19. The air drying arrangement as in claim 18, the unitary coupling device further including:
an adapter portion, the adapter portion being in fluid communication with the single air dryer body;
a manifold portion, the manifold portion being in fluid communication with the first desiccant canister and the second desiccant canister; and
an inner chamber formed by the cooperation of the adapter portion and the manifold portion, the inner chamber being in fluid communication with a purge air inlet.

* * * * *